US011740510B2

(12) United States Patent
Ikeda et al.

(10) Patent No.: US 11,740,510 B2
(45) Date of Patent: Aug. 29, 2023

(54) DISPLAY DEVICE

(71) Applicant: Japan Display Inc., Tokyo (JP)

(72) Inventors: Kojiro Ikeda, Tokyo (JP); Tenfu Nakamura, Tokyo (JP); Kentaro Okuyama, Tokyo (JP); Zhengyi Gou, Tokyo (JP); Hisanori Kawakami, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/651,845

(22) Filed: Feb. 21, 2022

(65) Prior Publication Data
US 2022/0179269 A1 Jun. 9, 2022

Related U.S. Application Data

(63) Continuation of application No. PCT/JP2020/025405, filed on Jun. 26, 2020.

(30) Foreign Application Priority Data

Aug. 22, 2019 (JP) .................................. 2019-152190

(51) Int. Cl.
G02F 1/13357 (2006.01)
G02F 1/1362 (2006.01)
G02F 1/1368 (2006.01)

(52) U.S. Cl.
CPC ...... *G02F 1/133615* (2013.01); *G02F 1/1368* (2013.01); *G02F 1/136286* (2013.01)

(58) Field of Classification Search
CPC ......... G02F 1/133615; G02F 1/133616; G02F 1/136289; G02F 1/1368
See application file for complete search history.

(56) References Cited

U.S. PATENT DOCUMENTS

2003/0146688 A1 8/2003 Kitazawa et al.
2007/0230216 A1 10/2007 Ite et al.
(Continued)

FOREIGN PATENT DOCUMENTS

JP 2003-229011 A 8/2003
JP 2007-273091 A 10/2007
(Continued)

OTHER PUBLICATIONS

International Search Report dated Sep. 1, 2020 in PCT/JP2020/025405 filed on Jun. 26, 2020, 2 pages.

*Primary Examiner* — Dung T Nguyen
(74) *Attorney, Agent, or Firm* — Maier & Maier, PLLC

(57) ABSTRACT

According to one embodiment, a display device includes a first substrate, a second substrate, a liquid crystal layer, a first light guide element and a light-emitting element. The liquid crystal layer contains stringy polymers and liquid crystal molecules. The first light guide element includes a third transparent substrate including a side surface and a main surface, and a transparent layer disposed on the main surface and having a refractive index lower than that of the third transparent substrate. The light-emitting element opposes the side surface, and the third transparent substrate is adhered to the second transparent substrate while interposing the transparent layer therebetween. The light-emitting element is disposed on the second transparent substrate.

9 Claims, 11 Drawing Sheets

(56) References Cited

U.S. PATENT DOCUMENTS

2010/0085510 A1\*  4/2010  Okuyama ......... G02F 1/133615
                                                       349/187
2016/0070047 A1   3/2016  Okuyama et al.
2019/0041673 A1\*  2/2019  Numata .............. G02F 1/13306

FOREIGN PATENT DOCUMENTS

| JP | 2010-092682 A | 4/2010 |
| JP | 2016-057338 A | 4/2016 |
| JP | 2019-032411 A | 2/2019 |

\* cited by examiner

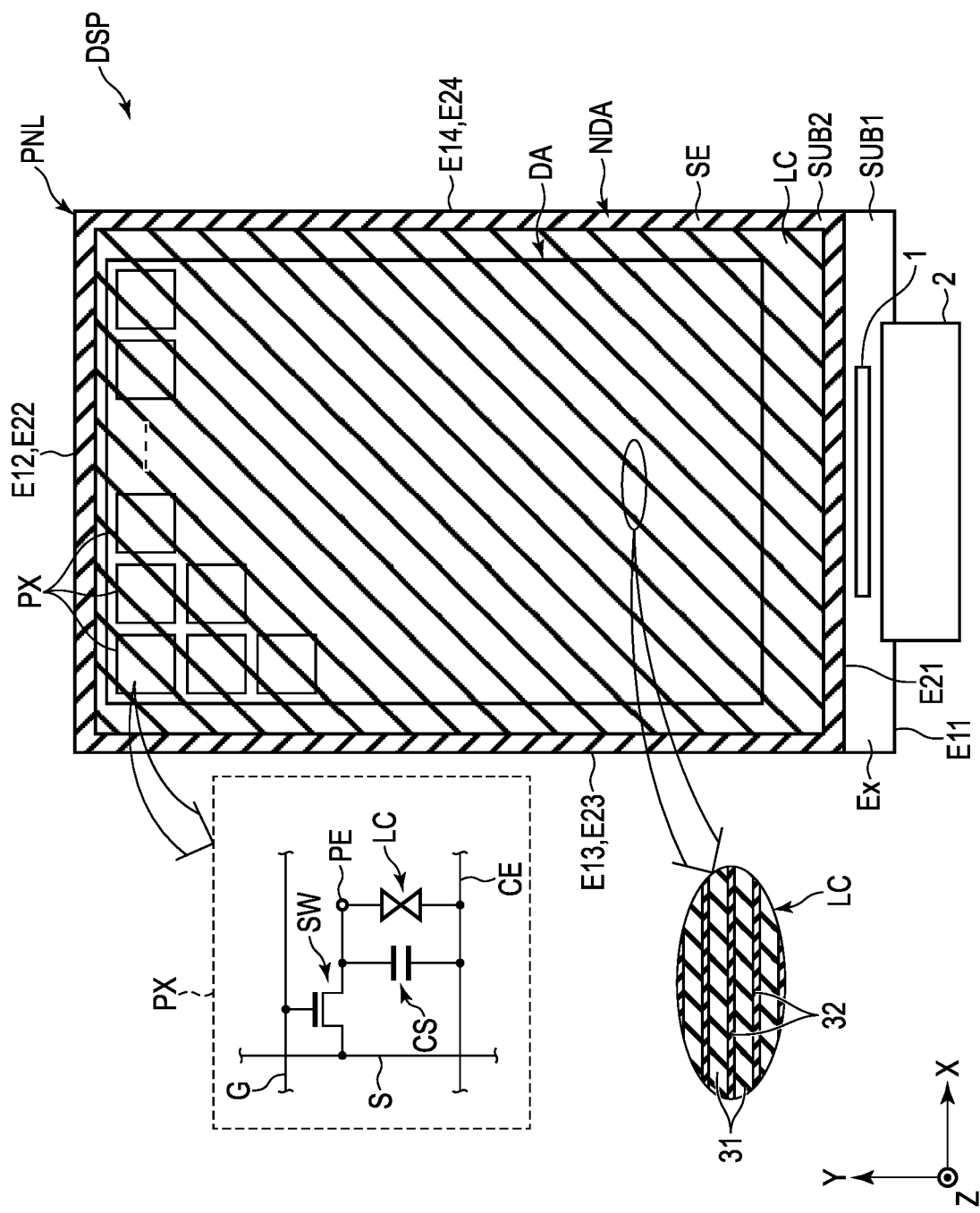
F I G. 1

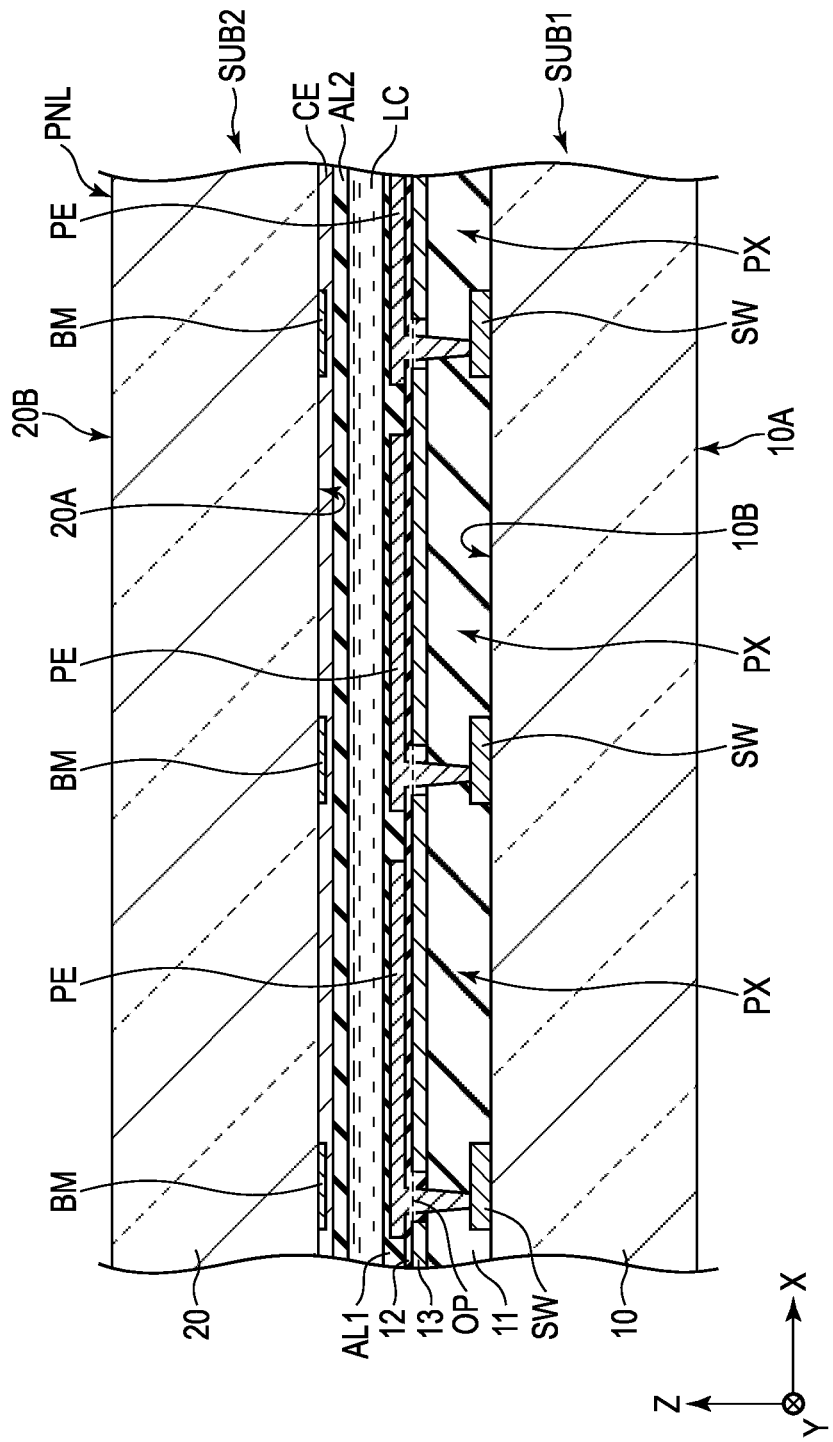
F I G. 2

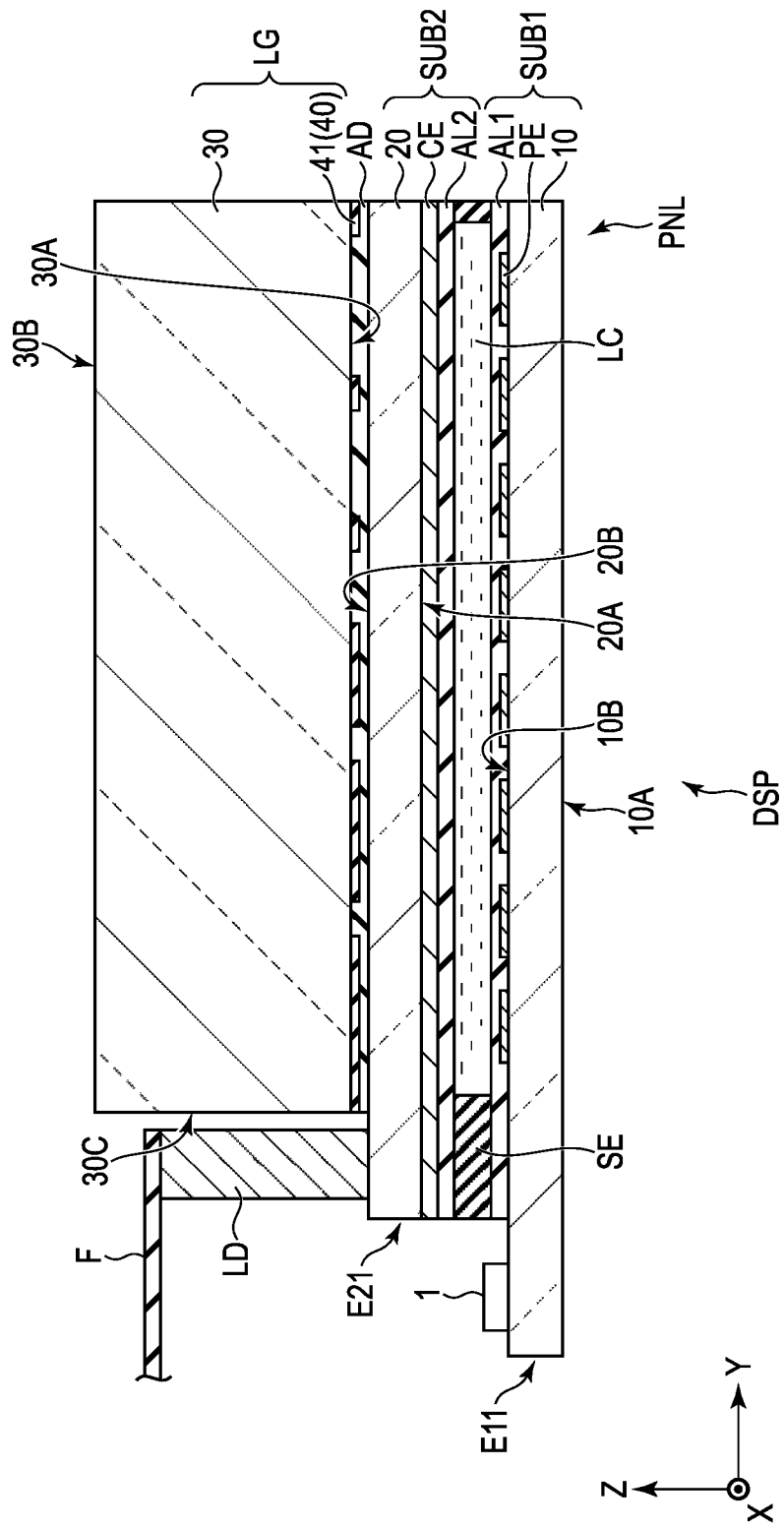
F I G. 6

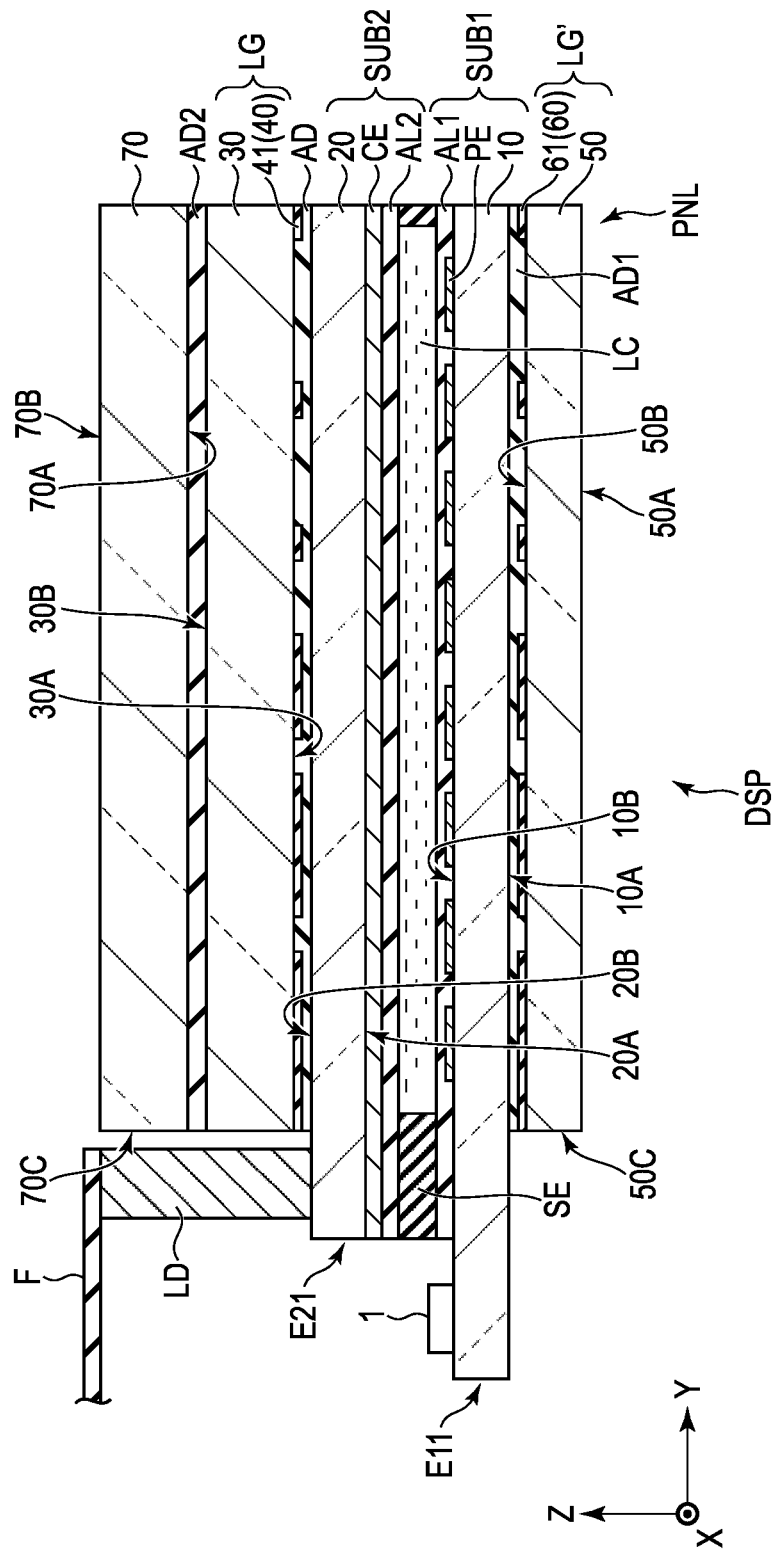
F I G. 10

DISPLAY DEVICE

CROSS-REFERENCE TO RELATED APPLICATIONS

This application is a Continuation Application of PCT Application No. PCT/JP2020/025405, filed Jun. 26, 2020 and based upon and claiming the benefit of priority from Japanese Patent Application No. 2019-152190, filed Aug. 22, 2019, the entire contents of all of which are incorporated herein by reference.

FIELD

Embodiments described herein relate generally to a display device.

BACKGROUND

Recently, display devices comprising a light source, a pair of substrates including pixel electrodes and common electrodes, and a polymer-dispersed liquid crystal layer disposed between these substrates are known. For example, the polymer-dispersed liquid crystal layer contains stringy polymers and liquid crystal molecules.

In the polymer-dispersed liquid crystal layer, the tilt of the optical axes of the liquid crystal molecules relative to the optical axis of the polymer can be controlled by rotating the liquid crystal molecules with the electric field between the pixel electrode and the common electrode. In this manner, it is possible to control the degree of scattering of light from the light source for each pixel and to display any video (images) on the display device.

In the display devices comprising such a polymer-dispersed liquid crystal layer, there is a demand for further improving the display quality.

BRIEF DESCRIPTION OF THE DRAWINGS

FIG. 1 is a plan view of a configuration example of a display device according to an embodiment.

FIG. 2 is a cross-sectional view of a display panel shown in FIG. 1.

FIG. 6 is a cross-sectional view schematically showing another configuration example different from that shown FIG. 5.

FIG. 10 is a cross-sectional view schematically showing still another configuration example different from that shown FIG. 5.

DETAILED DESCRIPTION

Figure 3:
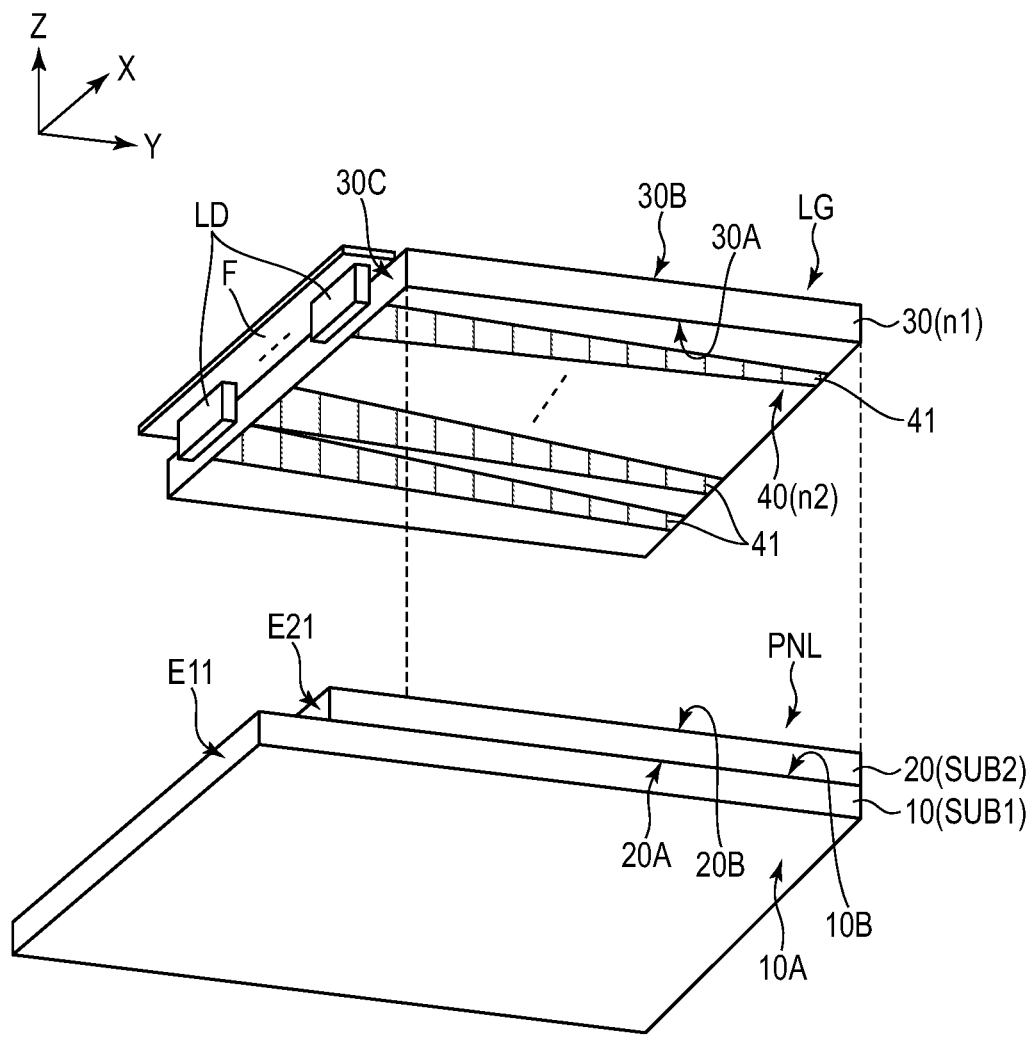
FIG. 3 is an exploded perspective view showing a main part of the display device shown in FIG. 1.

In general, according to one embodiment, a display device comprises a first substrate comprising a first transparent substrate, a scanning line, a signal line intersecting the scanning line, a switching element electrically connected to the scanning line and the signal line, and a pixel electrode electrically connected to the switching element, a second substrate comprising a second transparent substrate and a common electrode opposing the pixel electrode, a liquid crystal layer held between the first substrate and the second substrate and containing stringy polymers and liquid crystal molecules, a first light guide element comprising a third transparent substrate including a first side surface and a first main surface, and a first transparent layer disposed on the first main surface and having a refractive index lower than that of the third transparent substrate and a light-emitting element opposing the first side surface, and the third transparent substrate is adhered to the second transparent substrate while interposing the first transparent layer therebetween, and the light-emitting element being disposed on the second transparent substrate.

According to another embodiment, a display device comprises a first substrate comprising a first transparent substrate, a scanning line, a signal line intersecting the scanning line, a switching element electrically connected to the scanning line and the signal line, and a pixel electrode electrically connected to the switching element, a second substrate comprising a second transparent substrate and a common electrode opposing the pixel electrode, a liquid crystal layer held between the first substrate and the second substrate and containing stringy polymers and liquid crystal molecules, a first light guide element comprising a third transparent substrate including a first side surface and a first main surface, and a first transparent layer disposed on the first main surface and having a refractive index lower than that of the third transparent substrate, a second light guide element comprising a fourth transparent substrate including a second side surface and a second main surface, and a second transparent layer disposed on the second main surface and having a refractive index lower than that of the fourth transparent substrate and a light-emitting element, and the third transparent substrate is adhered to the second transparent substrate while interposing the first transparent layer therebetween, the fourth transparent substrate being adhered to the first transparent substrate while interposing the second transparent layer therebetween, the first side surface and the second side surface being overlapped on each other in plan view, and the light-emitting element being disposed in a region of the first transparent substrate, where the first transparent substrate and the second transparent substrate are not overlapped in plan view, and at least a part thereof opposing the first side surface.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the drawings, reference symbols of the same or similar elements which are sequentially arranged may be omitted. Further, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view of a configuration example of a display device DSP of this embodiment. For example, a first direction X, a second direction Y and a third direction Z are orthogonal to each other, but may intersect at an angle other than ninety degrees. The first direction X and the second direction Y correspond to directions parallel to a main surface of a substrate which constitutes the display device DSP, and the third direction Z corresponds to a thickness direction of the display device DSP. In the following descriptions, a direction from a first substrate SUB1 towards a second substrate SUB2 is referred to as "upward" (or simply "up" or "above") and a direction from the second substrate SUB2 to the first substrate SUB1 is referred to as "downward" (or simply "down" or "below"). With such expressions "a second member above a first member" and "a second member below a first member", the second member may be in contact with the first member or may be remote from the first member. In addition, it is assumed that there is an observation position to observe the display device DSP on a tip side of an arrow in a third direction Z, and viewing from this observation position toward the X-Y plane defined by the first direction X and the second direction Y is referred to as a planar view.

In this embodiment, as an example of the display device DSP, a liquid crystal display device to which a polymer-dispersed liquid crystal will be described. The display device DSP comprises a display panel PNL, an IC chip 1 and a wiring substrate 2.

The display panel PNL comprises a first substrate SUB1, a second substrate SUB2, a liquid crystal layer LC and a sealant SE. The first substrate SUB1 and the second substrate SUB are each formed in a flat plate shape parallel to the X-Y plane. The first substrate SUB1 and the second substrate SUB 2 are overlapped on each other in plan view. The first substrate SUB1 and the second substrate SUB 2 are bonded together by a sealant SE. The liquid crystal layer LC is held between the first substrate SUB1 and the second substrate SUB2 and is sealed by the sealant SE. In FIG. 1, the liquid crystal layer LC and the sealant SE are indicated by different shaded lines.

As enlarged and schematically shown in FIG. 1, the liquid crystal layer LC contains a polymer-dispersed liquid crystal consisting of polymers 31 and liquid crystal molecules 32. For example, the polymers 31 are liquid crystalline polymers. The polymers 31 are formed into a stringy shape extending along the first direction X. The liquid crystal molecules 32 are dispersed in the spaces between the polymers 31 and are aligned such that their longitudinal axes are set along the first direction X. Each of the polymers 31 and the liquid crystal molecules 32 has optical anisotropy or refractive index anisotropy. The responsiveness of the polymers 31 to electric fields is lower than that of the liquid crystal molecules 32 to electric fields.

For example, the alignment direction of the polymers 31 does not substantially change regardless of the presence/absence of an electric field. On the other hand, the alignment direction of the liquid crystal molecules 32 changes according to the electric field when a voltage higher than the threshold is applied to the liquid crystal layer LC. While voltage is not being applied to the liquid crystal layer LC, the optical axes of the polymers 31 and the liquid crystal molecules 32 are parallel to each other, and the light entering the liquid crystal layer LC passes through the liquid crystal layer LC without being substantially scattered (a transparent state). When the voltage is being applied to the liquid crystal layer LC, the optical axes of the polymers 31 and the liquid crystal molecules 32 cross each other, and the light entering the liquid crystal layer LC is scattered within the liquid crystal layer LC (a scattered state).

The display panel PNL comprises a display area DA that displays images, and a frame-shaped non-display area NDA that surrounds the display area DA. The sealant SE is located on the non-display area NDA. The display area DA comprises pixels PX arranged in a matrix along the first direction X and the second direction Y.

As enlarged and shown in FIG. 1, each pixel PX comprises a switching element SW, a pixel electrode PE, a common electrode CE, a liquid crystal layer LC and the like. The switching element SW is constituted, for example, by a thin-film transistor (TFT) and is electrically connected to the respective scanning line G and the respective signal line S. The scanning line G is electrically connected to the signal line S. The scanning line G is electrically connected to the switching element SW in each of the pixels PX aligned along the first direction X. The signal line S is electrically connected to the switching element SW of each of the pixels PX aligned along the second direction Y. The pixel electrodes PE is electrically connected to the switching element SW. Each of the pixel electrodes PE opposes the common electrode CE, and drives the liquid crystal layer LC (in particular, the liquid crystal molecules 32) with the electric field generated between the pixel electrode PE and the common electrode CE. The capacitance CS is formed, for example, between the electrode at the same potential as that of the common electrode CE and the electrode at the same potential as that of the pixel electrode PE.

The first substrate SUB1 includes edges E11 and E12, extending along the first direction X, and edges 513 and E14, extending along the second direction Y. The second substrate SUB2 includes edges E21 and E22, extending along the first direction X, and edges E23 and E24, extending along the second direction Y. In the example illustrated in FIG. 1, in plan view, the edges 512 and E22, the edges 513 and E23, and the edges 514 and E24 overlap each other, but they may not necessarily overlap each other. The edge E21 is located between the edge E11 and the display area DA in plan view. The first substrate SUB1 includes an extended portion between the edge E11 and the edge E21.

FIG. 2 is a cross-sectional view showing an example configuration of the display panel PNL shown in FIG. 1. The first substrate SUB1 comprises a transparent substrate 10 (a first transparent substrate), insulating films 11 and 12, capacitive electrodes 13, switching elements SW, pixel electrodes PE and an alignment film AL1. The first substrate SUB1 further comprises the scanning lines G and the signal lines S shown in FIG. 1. The transparent substrate 10 comprises a main surface (a lower surface) 10A and a main surface (an upper surface) 10B on the opposite side to the main surface 10A. The switching elements SW are disposed on the main surface 10B. The insulating film 11 covers the switching elements SW. The capacitive electrodes 13 are located between the insulating films 11 and 12. The pixel electrodes PE are each located on the insulating film 12 for each pixel PX. The pixel electrodes PE are electrically connected to the respective switching elements SW via openings OP of the respective capacitive electrodes 13. The pixel electrodes PE overlap the capacitive electrodes 13, respectively, while interposing the insulating film 12, thus forming the capacitances CS of the pixels PX, respectively. The alignment film AL1 covers the pixel electrodes PE.

The second substrate SUB2 comprises a transparent substrate 20 (a second transparent substrate), light-shielding layers BM, a common electrode C, and an alignment film AL2. The transparent substrate 20 comprises a main surface (lower surface) 20A and a main surface (upper surface) 20B on the opposite side to the main surface 20A. The main surface 20A of the transparent substrate 20 opposes the main surface 10B of the transparent substrate 10. The light-shielding layers BM and the common electrode CE are disposed on the main surface 20A. The light-shielding layers BM are located, for example, directly above the respective switching elements SW and directly above the respective scanning line G and the respective signal line S, which are not shown in the figure. The common electrode CE is disposed over a plurality of pixels PX and directly covers the light-shielding layers BM. The common electrode CE is electrically connected to the capacitance electrodes 13 and is at the same potential as that of the capacitance electrodes 13. The alignment film AL2 covers the common electrode CE.

The liquid crystal layer LC is located between the main surface 10B and the main surface 20A, and is in contact with the alignment films AL1 and AL2. In the first substrate SUB1, the insulating films 11 and 12, the capacitive electrodes 13, the switching elements SW, the pixel electrodes PE and the alignment film AL1 are located between the main surface 10B and the liquid crystal layer LC. In the second substrate SUB2, the light-shielding layers BM, the common electrode CE and the alignment film AL2 are located between the main surface 20A and the liquid crystal layer LC.

The transparent substrates 10 and 20 are insulating substrates such as glass or plastic substrates. The main surfaces 10A and 10B and the main surfaces 20A and 20B are substantially parallel to the X-Y plane. The insulating film 11 is formed of a transparent insulating material such as of silicon oxide, silicon nitride, silicon oxynitride, acrylic resin or the like. For example, the insulating film 11 includes an inorganic insulating film and an organic insulating film. The insulating film 12 is an inorganic insulating film such as of silicon nitride. The capacitance electrodes 13, the pixel electrodes PE and the common electrode CE are transparent electrodes formed of a transparent conductive material such as indium tin oxide (ITO), indium zinc oxide (IZO) or the like. The light-shielding layers BM are conductive layers having a resistance lower than that of the common electrode CE. For example, the light-shielding layer BM is formed by an opaque metallic material such as molybdenum, aluminum, tungsten, titanium, silver or the like. The alignment films AL1 and AL2 are horizontal alignment films having an alignment restriction force that is substantially parallel to the X-Y plane. For example, the alignment films AL1 and AL2 are subjected to the alignment treatment along the first direction X. Note that the alignment treatment may be a rubbing treatment or a photo-alignment treatment.

FIG. 3 is an exploded perspective view showing a main part of the display device DSP shown in FIG. 1. The display device DSP comprises, in addition to the display panel PNL, a light guide element LG and a plurality of light-emitting elements LD. The first substrate SUB1, the second substrate SUB2, and the light guide element LG are aligned along the third direction Z in this order. The light-emitting elements LD are arranged to be spaced apart from each other along the first direction X. The light-emitting elements LD are connected to a wiring substrate F. The light-emitting elements LD are, for example, light-emitting diodes. Although not described in detail, the light-emitting elements each comprises a red light-emitting portion, a green light-emitting portion and a blue light-emitting portion. The light emitted from the light-emitting elements LD travels along the direction of the arrow indicating the second direction Y.

The light guide element LG comprises a transparent substrate 30 (a third transparent substrate) and a transparent layer 40 (a first transparent layer).

The transparent substrate 30 is an insulating substrate such as a glass substrate or plastic substrate, and has a refractive index n1. For example, the transparent substrate 30 is not formed of a plurality of substrates stacked one on another, but is a single substrate. The transparent substrate 30 comprises a main surface (a lower surface) 30A, a main surface (an upper surface) 30B on the opposite side to the main surface 30A, and a side surface 30C. The main surfaces 30A and 30B are substantially parallel to the X-Y plane. The main surface 30A opposes the main surface 20B of the transparent substrate 20. The side surface 30C is substantially parallel to the X-Z plane defined by the first direction X and the third direction Z. The side surface 30C opposes the plurality of light-emitting elements LD. The transparent substrate 30 is adhered to the transparent substrate 20 while interposing the transparent layer 40 therebetween, as will be described below. In the example illustrated in FIG. 3, the side surface 30C is more than the edge E21 of the second substrate SUB In the example shown in FIG. 3, the side surface 30C is located inside the edge E21 of the second substrate SUB2, and the plurality of light-emitting elements facing the side surface 30C LDs are located in the area between the edge E21 and the side surface 30C.

The transparent layer 40 is disposed on the main surface 30A. The transparent layer 40 has a refractive index n2 that is lower than the refractive index n1 of the transparent substrate 30. For this reason, the transparent layer 40 may be referred to as a low refractive index layer. The transparent layer 40 comprises a plurality of strip portions 41 spaced apart from each other along the first direction X. Each of the strip portions 41 extends along the second direction Y. Between each adjacent pair of strip portions 41, the main surface 30A is exposed. The shape of the transparent layer 40 will be described in detailed later.

The transparent substrate 30 is made, for example, of glass or an organic material such as polymethyl methacrylate (PMMA) or polycarbonate (PC). The transparent layer 40 is made, for example, of an organic material such as a siloxane-based resin or fluorine-based resin. The refractive index n1 of the transparent substrate 30 is about 1.5, and the refractive index n2 of the transparent layer 40 is about 1.0 to 1.4.

Figure 4:
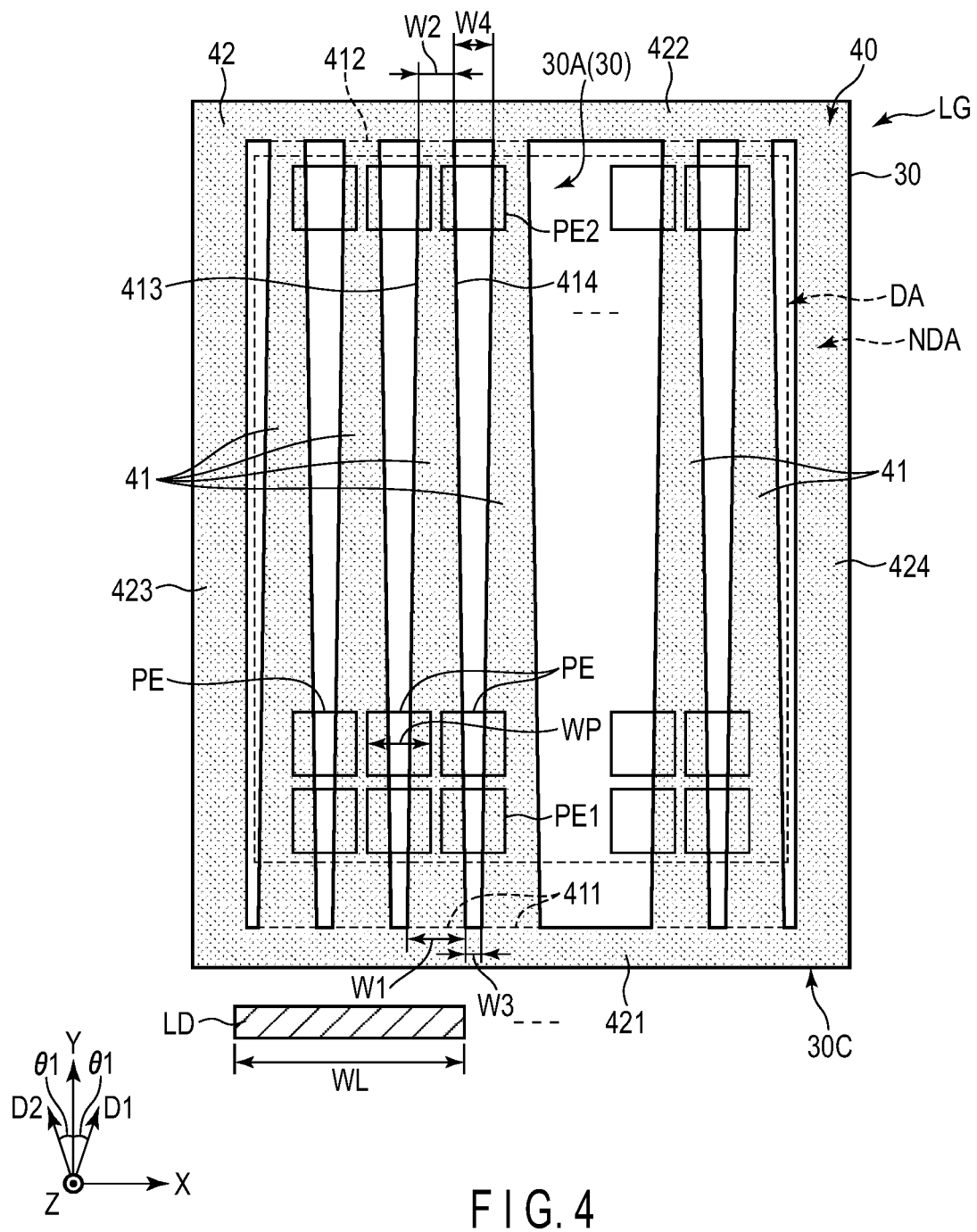
FIG. 4 is a plan view of a configuration example of a light guide element shown in FIG. 3.

FIG. 4 is a plan view showing a configuration example of the light guide element LG shown in FIG. 3. The transparent layer 40 comprises a plurality of strip portions 41 and a frame 42 surrounding the strip portions 41. The strip portions 41 and the frame 42 are formed to be integrated as one body.

The strip portions 41 each comprise a first end portion 411 on a side opposing the light-emitting element LD, a second end portion 412 on a side opposite to the first end portion 411, a first edge 413 and a second edge 414. The first end portion 411 and the second end portion 412 have a first width W1 and a second width W2, respectively. The width in this specification corresponds to a length along the first direction X. The first width W1 is greater than the second width W2. For example, the first width W1 is less than the width WL of a single light-emitting element LD, and a single light-emitting element LD is disposed across a plurality of strip portions 41 aligned along the first direction X. Further, the first width W1 is equal to or less than the width WP of a single pixel electrode PE (or the pitch of the pixel electrodes PE aligned along the first direction X).

The first edge 413 and the second edge 414 extend along a direction different from the first direction X or the second direction Y between the first end portion 411 and the second end portion 412. Here, for example, the direction that intersects the second direction Y at an acute angle clockwise is defined as a direction D1, and the direction that intersects the second direction Y at an acute angle counterclockwise is defined as a direction D2. Note that an angle θ1 made between the second direction Y and the direction D1, and an angle θ1 between the second direction Y and the direction D2 are the same as each other, but the configuration is not limited to this. The angle between the second direction Y and the direction D1 and the angle between the second direction Y and the direction D2 may be different from each other. The first edge 413 extends along the direction D1, and the second edge 414 extends along the direction D2. Here, both the first edge 413 and the second edge 414 extend linearly but they may also be formed into a curved line. The first width W1 and the second width W2 correspond to the distance between the first edge 413 and the second edge 414. The strips 41 having such a shape has a width which gradually decreases at a constant rate or at any rate as it is located from the first end portion 411 towards the second end portion 412.

Focusing on two strip portions 41 adjacent to each other, the gap between the first end portions 411 and the gap between the second end portions 412 have a third width W3 and a fourth width W4, respectively. The third width W3 is less than the first width W1, the fourth width W4 is less than the second width W2, and the third width W3 is less than the fourth width W4. For example, the second width W2 is about ⅔ of the first width W1, the first width W1 is about nine times the third width W3, the second width W2 is about 1.5 times the fourth width W4, and the fourth width W4 is about four times the third width W3. It is preferable that the pitch of the adjacent strip portions 41 should be twice or less than the width WP of the pixel electrodes PE (or the pitch of the pixel electrodes PE aligned along the first direction X).

The pixel electrodes PE each overlap the respective adjacent pair of strip portions 41 in plan view. The pixel electrodes PE overlap the main surface 30A of the transparent substrate 30 between the strip portions 41. In the display area DA, a pixel electrode PE1, which is closest to the light-emitting element LD and a pixel electrode PE2, which is farthest from the light-emitting element LD are now focused. The area of the pixel electrode PE1, which overlaps the strip portions 41 is greater than the area of the pixel electrode PE2, which overlaps the strip portions 41. Further, the area of the pixel electrode PE1, which overlaps the main surface 30A is greater than the area of the pixel electrode PE2, which overlaps the main surface 30A. Note, as will be explained later, that the area overlapping the strip portions 41 is equivalent to the area where light from the light-emitting elements LD does not substantially enters, and the area overlapping the main surface 30A is equivalent to the area where light from the light-emitting elements LD can enter.

When the display panel PNL and the light guide element LG shown in FIG. 3 are overlapped with each other, the strip portions 41 are overlapped on the display area DA, and the frame 42 is overlapped on the non-display area NDA. The frame portion 42 comprises a first portion 421 and a second portion 422, extending along the first direction X, and a third portion 441 and a fourth portion 424, extending along the second direction Y. The first portion 421 is located between the light-emitting element LD and the display portion DA. The first portion 421 is connected to the first end portions 411 of the strip portions 41. In the example illustrated in FIG. 4, the second portions 422 of the strip portions 41 are connected to the second end portions 412, respectively, but they may be spaced apart from the second end portions 412. The strip portions 41 does not include edges parallel to the first direction X in the display area DA, but only the first edge 413 and the second edge 414, which are inclined with respect to the first direction X and the second direction Y, respectively, are overlapped on the display area DA.

Figure 5:
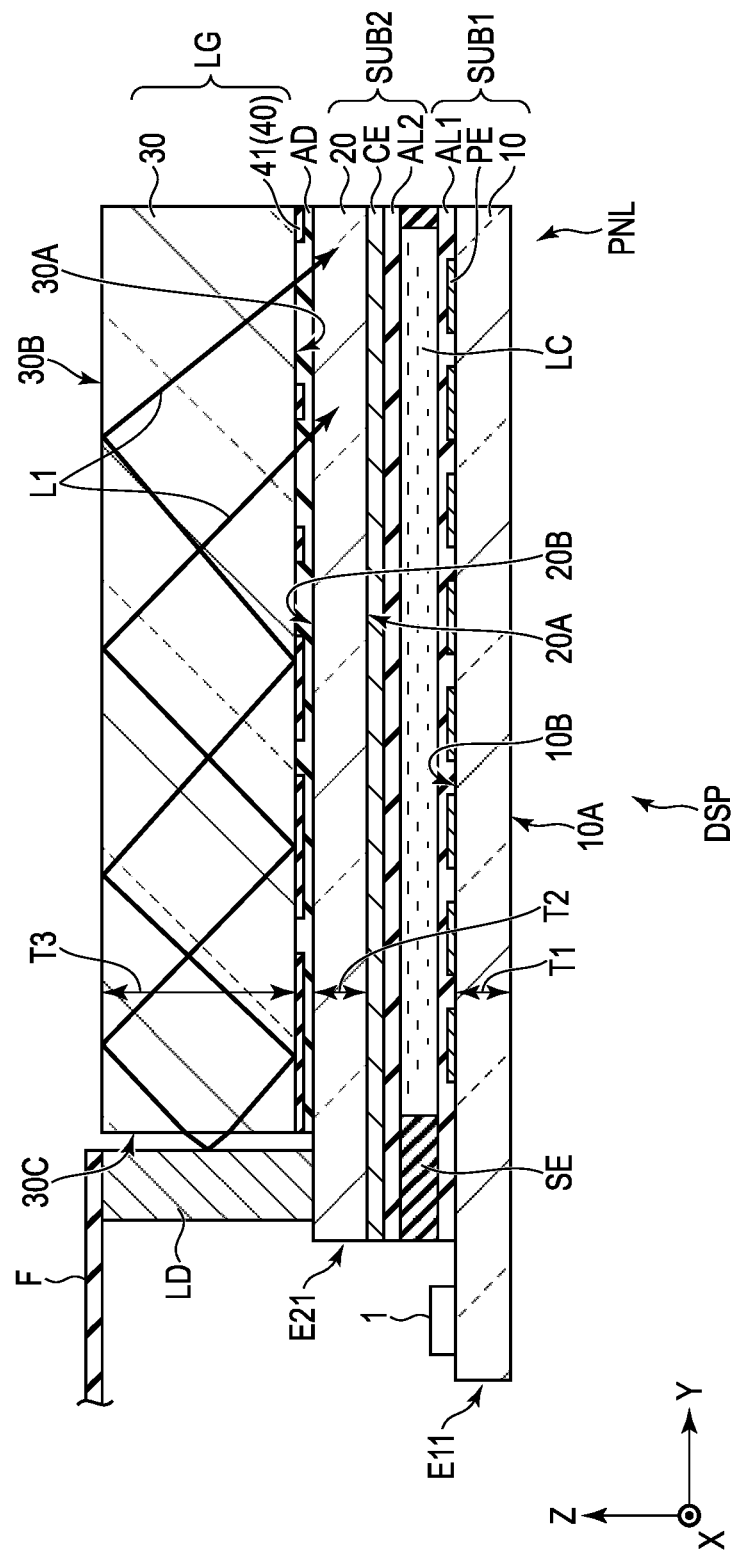
FIG. 5 is a cross-sectional view schematically showing of a configuration example of the display device shown in FIG. 1.

FIG. 5 is a cross-sectional view schematically showing a configuration example of the display device DSP of this embodiment. Note that, for the display panel PNL, only the main part thereof is shown in the figure. In the configuration example illustrated in FIG. 5, the transparent substrate 30 of the light guide element LG is adhered to the transparent substrate 20 of the second substrate SUB2 by a transparent adhesive layer AD, and the light-emitting element is placed on the area of the main surface 20B of the transparent substrate 20, where the transparent substrate 20B and the transparent substrate 30 do not overlap each other in plan view.

The transparent layer 40 including the strip portions 41 is in contact with the main surface 30A. As shown in FIG. 4, the area where the pixel electrodes PE overlap the strip portions 41 is greater in the region as it is closer to the light-emitting element LD, whereas less in the region as it is farther from the light-emitting element LD. With this configuration, as shown in FIG. 5, the area of the transparent layer 40 in contact with the main surface 30A is greater in the region as it is closer to the light-emitting element LD, whereas less in the region as it is farther from the light-emitting element LD. In plan view, the transparent adhesive layer AD is in contact with the main surface 2B in the area where the transparent substrate 20 and the transparent substrate 30 overlap each other, and also covers the transparent layer 40. In the region where the transparent layer 40 does not exist, the transparent adhesive layer AD is in contact with the main surface 30A.

The refractive indices of the transparent substrates 10 and 20 with respect to the transparent adhesive layer AD are equivalent to the refractive index n1 of the transparent substrate 30, and higher than the refractive index n2 of the transparent layer 40. Note here that the term "equivalent" is not limited to the case where the difference in refractive indices is zero, but includes the case where the difference in refractive index is 0.03 or less.

The transparent substrate 10 has a thickness T1, the transparent substrate 20 has a thickness T2, and the transparent substrate 30 has a thickness T3. The term "thickness" used in this specification corresponds to the length along the third direction Z. In the illustrated example, the thickness T1 is equivalent to the thickness T2, and the thickness T3 is greater than the thickness T1 and the thickness T2. For example, the thickness T3 is 200 μm to 2000 μm.

Next, with reference to FIG. 5, light L1 emitted from each light-emitting element LD will be described.

The light-emitting element LD emits the light L1 toward the side surface 30C. Since there is an air layer between the light-emitting element LD and the side surface 30C, the light L1 emitted from the light-emitting element LD is refracted by the side surface 30C and enters the transparent substrate 30. Of the light L1 having entered the transparent substrate 30, a portion traveling from the transparent substrate 30 toward the transparent layer 4 is reflected by an interface between the transparent substrate 30 and the transparent layer 40. On the other hand, a portion of the light L1 having entered the transparent substrate 30, which travels toward the main surface 30B is reflected by an interface between the transparent substrate 30 and the air layer. In this manner, in the vicinity of the side surface 30C (or the area where the transparent layer 40 exists), the light L1 travels inside the transparent substrate 30 while being reflected repeatedly. Of the light that travels inside the transparent substrate 30, the portion traveling toward the area where the transparent layer 40 does not exist, that is, the area where the transparent substrate 30 and the transparent adhesive layer AD are in contact with each other, passes through the transparent substrate 30 and then the transparent substrate 20 via the transparent adhesive layer AD. In other words, in the region close to the light-emitting element LD, the entering of the light L1 from the light-emitting element LD to the display panel PNL is suppressed, whereas in the region distant from the light-emitting element LD, the entering of the light L1 to the display panel PNL is promoted. Note that in the region close to the light-emitting element LD, the light L1 partially enters the display panel PNL, and as shown in FIG. 4, the light L1 enters the display panel PNL through gaps between adjacent pairs of strip portions 41.

The light L1 having entered the display panel PNL passes through those pixels which are in the transparent state and is scattered by those pixels in the scattering state. The display device DSP can be observed from the main surface 30B side and also from the main surface 10A side. Further, the display device DSP is a so-called transparent display and the background of the display unit DSP can be observed via the display unit DSP even when observed from the main surface 30B side or from the main surface 10A side.

Here, let us suppose, as a configuration of a general display device, a case where there is no structure corresponding to the light guide element LG in this embodiment, and each light-emitting element LD is disposed to face the side surface (the edge portion E11) of the transparent substrate 10 or the side surface (the edge portion E21) of the transparent substrate 20. In this case, light emitted from the light-emitting element LD enters the transparent substrate 10 or 20 placed to face thereto, and proceeds while repeating reflection on the interface between the transparent substrate 10 and the air layer and on the interface between the transparent substrate 20 and the air layer.

However, as mentioned above, between the transparent substrate 10 and the transparent substrate 20, the switching elements SW, the pixel electrodes PE, the alignment film AL1, the alignment film AL2, the common electrode CE and the light-shielding layers BM are placed. Therefore, the light emitted from the light-emitting element LD is attenuated due to undesirable absorption and scattering caused by these various elements as it travels from the light-emitting element LD to a remote region. As a result, a rapid decrease in brightness may occur in the regions distant away from the light-emitting element LD. According to the study of the inventors, the brightness of the region distant from the light-emitting element LD may become about ¹⁄₂₀ of the brightness of the region close to the light-emitting element LD. This is not desirable for viewers.

In contrast, the display device DSP of this embodiment comprises the light guide element LG and each light-emitting element LD is placed at the same height as that of the side surface 30C of the transparent substrate 30 contained in the light-guiding element LG. In other words, the light-emitting elements LD are arranged so that the entire emission surface of each light-emitting element LD opposes the side surface 30C of the transparent substrate 30.

Further, the light guide element LG includes the transparent layer 40 disposed therein and having a refractive index n2 that is lower than the refractive index n1 of the transparent substrate 30, and the area of the transparent layer 40, which is in contact with the main surface 30A is greater in the region as it is closer to the light-emitting element LD and less in the region as it is farther away from the light-emitting element LD.

With the above-described configuration, most of the light L1 emitted from the light-emitting element LD can be made to enter the transparent substrate 30. The light L1 having entered the transparent substrate 30 proceeds while repeatedly reflecting on the interface between the transparent substrate 30 and the transparent layer 40 and on the interface between the transparent substrate 30 and the air layer. Here, since the transparent substrate 30 does not contain elements that cause undesired absorption or scattering, the light L1 can proceeds as it is in the transparent substrate 30 without being attenuated. In other words, the light L1 emitted from the light-emitting element LD and having entered the transparent substrate 30 can travel to regions distant from each light-emitting device LD without being attenuated. Thus, it is possible to suppress a sudden decrease in brightness in regions distant from the light-emitting element LD.

Further, in the display device DSP of this embodiment, in order to place the light-emitting elements LD and the transparent substrate 30 included in the light guide element LG at the same height (in other words, to align the light-emitting elements LD and the light guide element LG at the same height), the transparent substrate 20 is extended to the non-display area NDA side as compared to the general configuration, and the light-emitting elements LD are placed on the transparent substrate 20. With this configuration, the light-emitting elements LD and the first substrate SUB1 can be separated farther from each other as compared to the case of the general configuration. When the light-emitting elements LD can be spaced away from the first substrate SUB1, it is possible to suppress the conduction of the heat generated by the light-emitting elements LD to the first substrate SUB1. In general, if the heat generated by the light-emitting elements LD propagates to the first substrate SUB1 (especially, the switching elements), a leakage current due to the heat may occur. However, in the display device DSP of this embodiment, the light-emitting elements LD and the first substrate SUB1 can be spaced away from each other, and therefore it is possible to suppress the leakage current caused by the heat.

Furthermore, in the display device DSP in this embodiment, as described above, the transparent substrate 20 is extended to the non-display area NDA side as compared to the general configuration, and the light-emitting elements LD are placed on the transparent substrate 20. With this configuration, those layers located below the transparent substrate 20, except for the transparent substrate 10, are configured as well to extend toward the non-display area NDA side. Thus, the edge of each layer extended toward the non-display area NDA side (that is, the end portion of each layer overlapping the edge portion E21 in plan view) can be spaced away from the switching elements contained in the first substrate SUB1. In the case where the end portion of each layer extending to the non-displayed area NDA side can be separated from the switching elements SW, even if moisture enters from the end portion of each layer, the possibility of the moisture reaching the switching elements SW can be lowered. According to this, it is possible to suppress corrosion of the switching element SW by moisture.

Various modified examples will now be described with reference to drawings.

FIG. 6 is a cross-sectional view schematically showing a configuration example different from that of the display device DSP shown in FIG. 5. The configuration example illustrated in FIG. 6 is different from that of FIG. 5 in that the transparent substrate 30 is thicker, that is, the thickness of the transparent substrate 30 is greater than the thickness of the light-emitting elements LD.

In such a configuration example, as shown in FIG. 6, the entire emission surface of each light-emitting element LD faces the side surface 30C of the transparent substrate 30, the light guide element LG including the transparent substrate 30 is provided with a transparent layer 40 having a refractive index lower than that of the transparent substrate 30, and the light-emitting elements LD are placed on the transparent substrate 20, as in the case of the previous example. Therefore, advantageous effects similar to those of the configuration example illustrated in FIG. 5 can be obtained.

Figure 7:
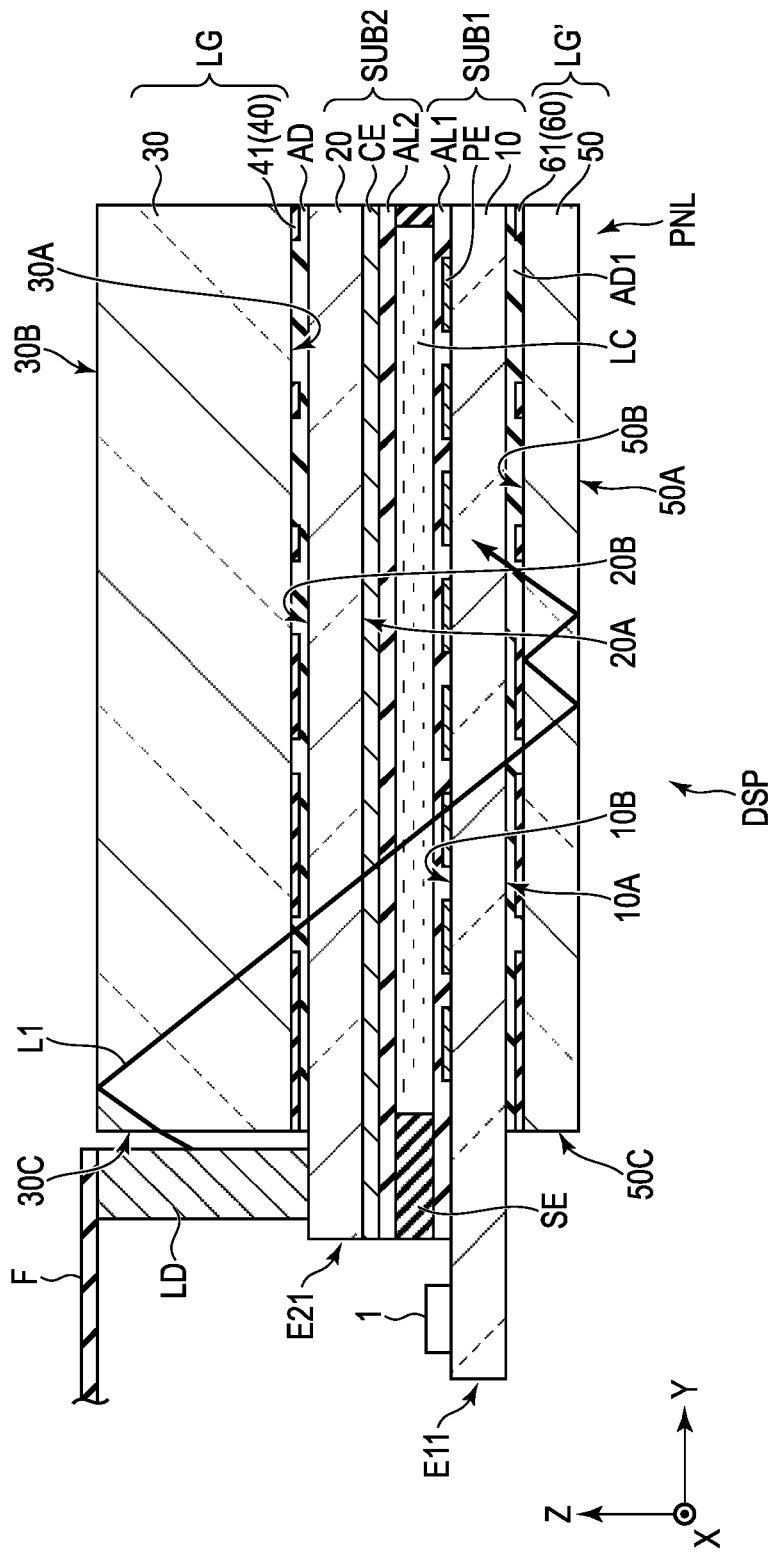
FIG. 7 is a cross-sectional view schematically showing still another configuration example different from that shown FIG. 5.

FIG. 7 is a cross-sectional view schematically showing a configuration example different from the display device DSP shown in FIG. 5. The configuration example illustrated in FIG. 7 is different from that of FIG. 5 in that a light guide element LG' (a second light guide element) is further provided below the first substrate SUB1, or more specifically, the transparent substrate 50 of the light guide element LG' is adhered to the transparent substrate 10 of the first substrate SUB1 by a transparent adhesive layer AD1.

The light guide element LG' comprises a transparent substrate 50 (a fourth transparent substrate) and a transparent layer 60 (a second transparent layer).

The transparent substrate 50 is an insulating substrate such as a glass substrate or a plastic substrate, and has a refractive index equivalent to the refractive index n1 of the transparent substrates 10 to 30 and the transparent adhesive layers AD and AD1. For example, the transparent substrate 50 is not formed from a plurality of substrates bonded together, but a single substrate. The transparent substrate 50 comprises a main surface (lower surface) 50A, a main surface (upper surface) 50B on the opposite side to the main surface 50A, and a side surface 50C. The main surface 50A and 50B are surfaces substantially parallel to the X-Y plane. The main surface 50B faces the main surface 10A of the transparent substrate 10. The side surface 50C is a surface substantially parallel to the X-Z plane. The transparent substrate 50 is adhered to the transparent substrate 10 while interposing the transparent layer 60 therebetween, as will be described below. In the example illustrated in FIG. 7, the side surface 50C is located directly below the side surface 30C of the transparent substrate 30 (that is, the side surfaces 30C and 50C are overlapped on one another in plan view).

The transparent layer 60 is disposed on the main surface 50B. The transparent layer 60 has a refractive index lower than the refractive index n1 of the transparent substrate 50 and equivalent to the refractive index n2 of the transparent layer 40 included in the light guide element LG. The transparent layer 60 comprises a plurality of strip portions 61 aligned along the first direction X, as in the case of the transparent layer 40 described above and each of the strip portions 61 extends along the second direction Y. Between adjacent strip portions 61, the main surface 50B is exposed. Note that the shape of the transparent layer 60 is similar to that of the transparent layer 40 described above, and therefore a detailed description thereof will be omitted here.

In such a configuration example, in the region close to the light-emitting device LD, of the light L1 emitted from each light-emitting element LD, the portion having passed which passes between two transparent layers 40 adjacent to each other enters the display panel PNL and is transmitted to the transparent adhesive layer AD, the second substrate SUB2, the liquid crystal layer LC, and the first substrate SUB1 in this order. Of the light having passed through the first substrate SUB1, the portion that passes between the two adjacent transparent layers 60 enters the transparent substrate 50 via the transparent adhesive layer AD1. This light proceeds toward the main surface 50A, is reflected by the interface between the transparent substrate 50 and the air layer, and then travels toward the transparent layer 60. The light traveling toward the transparent layer 60 is reflected by the interface between the transparent substrate 50 and the transparent layer 60, and proceeds again toward the main surface 50A. Thus, of the light L1 emitted from the light-emitting element LD, the portion having passed between the two adjacent transparent layers 40 and further passed between the two adjacent transparent layers 60, proceeds inside the transparent substrate 50 while being repeatedly reflected in the vicinity of the side surface 50C (or the region where the transparent layer 60 exists). Of the light that travels inside the transparent substrate 50, the portion which travels toward the area where the transparent layer 60 does not exist, that is, the area where the transparent substrate 50 and the transparent adhesive layer AD1 are in contact with each other, passes through the transparent substrate 50 and then passes through the transparent substrate 10 via the transparent adhesive layer AD1.

In the configuration example illustrated in FIG. 5, light that has passed between the two adjacent transparent layers 40 in the region close to the light-emitting device LD basically travels while being repeatedly reflected by the interface between the transparent substrate 10 and the air layer and by the interface between the transparent layer 40 and the transparent adhesive layer AD. Therefore, the light is attenuated due to undesired absorption and scattering by various types of elements placed on the first substrate SUB1 and the second substrate SUB2.

On the other hand, in the configuration example illustrated in FIG. 7, of the light that has passes between the two adjacent transparent layers 40 in the area close to the light-emitting device LD, the portion which further passes between two adjacent transparent layers 40 can be made to proceed inside the transparent substrate 50 while being repeatedly reflected on interface between of the transparent substrate 50 and the air layer and the interface between the transparent substrate 50 and the transparent layer 60. Since there are no elements placed on the transparent substrate 50, which cause undesired absorption or scattering, the light entering the transparent substrate 50 is not attenuated except for the attenuation caused by the light once transmitted by the first substrate SUB1 and the second substrate SUB2, and can proceed as it is in the transparent substrate 50. That is, the light entering the transparent substrate 50 is not attenuated, but is allowed to travel to the region distant from the side surface 50C, or in other words, the region distant from the light-emitting element LD. Thus, it is possible to further suppress the sudden decrease in brightness in the region distant away from the light-emitting element LD.

Note with the configuration example illustrated in FIG. 7, the thickness of the display device DSP is increased accordingly by the amount of the light guide element LG' provided here, thus making it possible to improve the physical strength of the display device DSP.

Further, in the configuration example illustrated in FIG. 7 as well, the entire emission surface of each light-emitting element LD opposes the side surface 30C of the transparent substrate 30, a transparent layer 40 having a refractive index lower than that of the transparent substrate 30 is provided and the light guide element LG including the transparent substrate 30, and the light-emitting elements LD are placed on the transparent substrate 20, as in the case of the previous example. Therefore, advantageous effects similar to those of the configuration example illustrated in FIG. 5 can be obtained.

Figure 8:
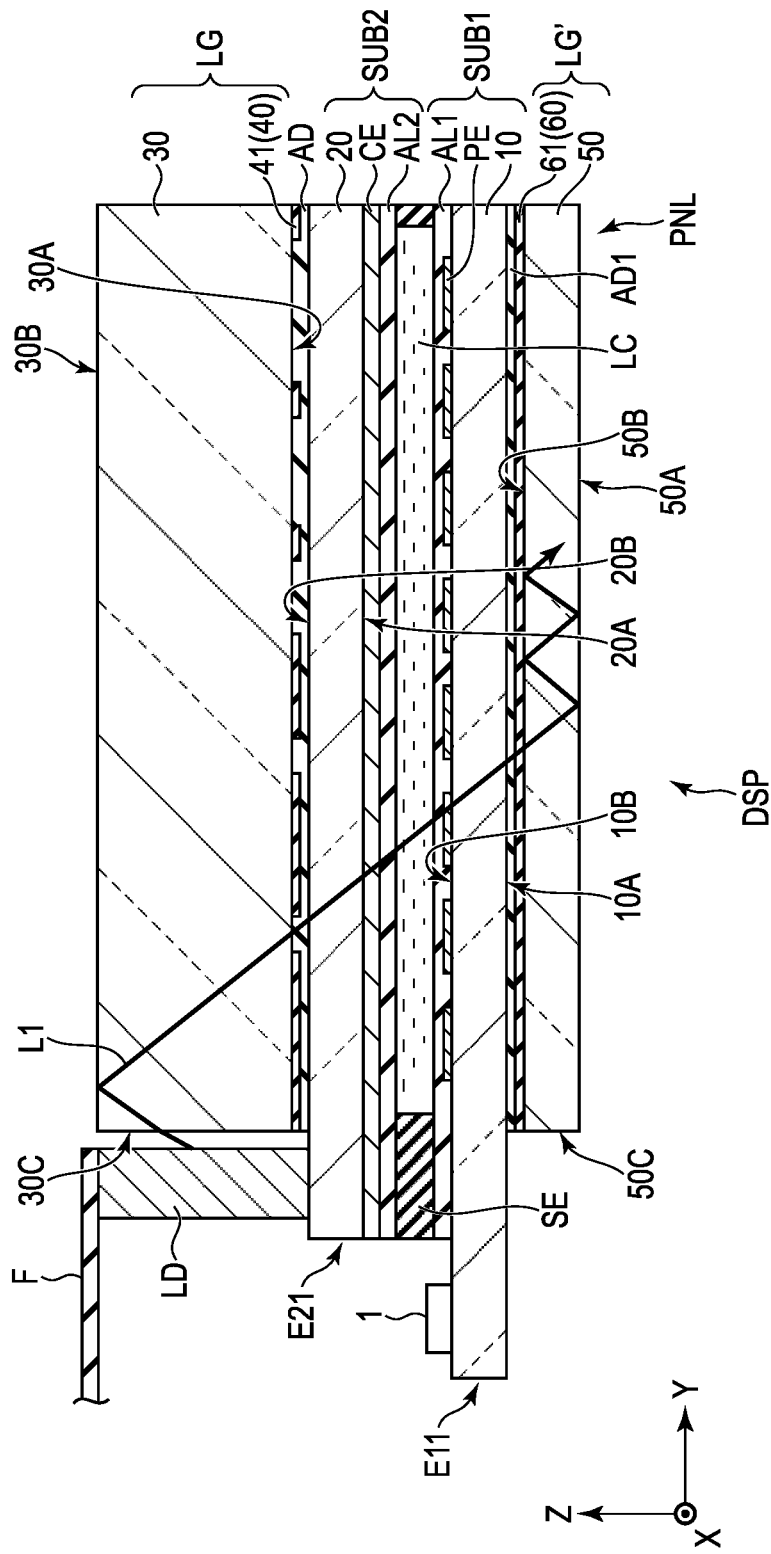
FIG. 8 is a cross-sectional view schematically showing still another configuration example different from that shown FIG. 5.

Note that for FIG. 7, such a case is assumed that the transparent layer 60 included in the light guide element LG' comprises a plurality of strip portions 61 aligned along the first direction X, as in the case of the transparent layer 40 included in the light guide element LG, and each of the strip portions 61 extends along the second direction Y. However, the transparent layer 60 included in the light guide element LG' may be arranged to cover the entire main surface 50B of the transparent substrate 50 as shown in FIG. 8, unlike the case of the transparent layer 40 included in the light guide element LG.

In this case, the light that has passed between two adjacent transparent layers 40 basically proceeds while being repeated reflected on the interface between the transparent layer 60 and the transparent adhesive layer AD1 and on the interface between the transparent layer 40 and the transparent adhesive layer AD. However, if the total reflection conditions are not met under certain conditions, the light may pass through the transparent layer 60 without being reflected by the transparent layer 60, as shown in FIG. 8. In this case, the light that has passed through the transparent layer 60 proceeds while being repeatedly reflected on the interface between the main surface 50A of the transparent substrate 50 and the air layer, and on the interface between the main surface 50A of the transparent substrate 50 and the transparent layer 60 as shown in FIG. 8, unless the total reflection conditions are not met again.

As described above, with the configuration that the transparent layer 60 is arranged to cover the entire main surface 50B of the transparent substrate 50, it is possible to prevent light that has passed through the transparent layer 60 due to the total reflection conditions being unmet, from returning to the first substrate SUB1 and the second substrate SUB2. With this configuration, the possibility of undesired scattering occurring in various elements disposed on the first substrate SUB1 and the second substrate SUB2, which results in degradation of display quality can be suppressed.

Figure 9:
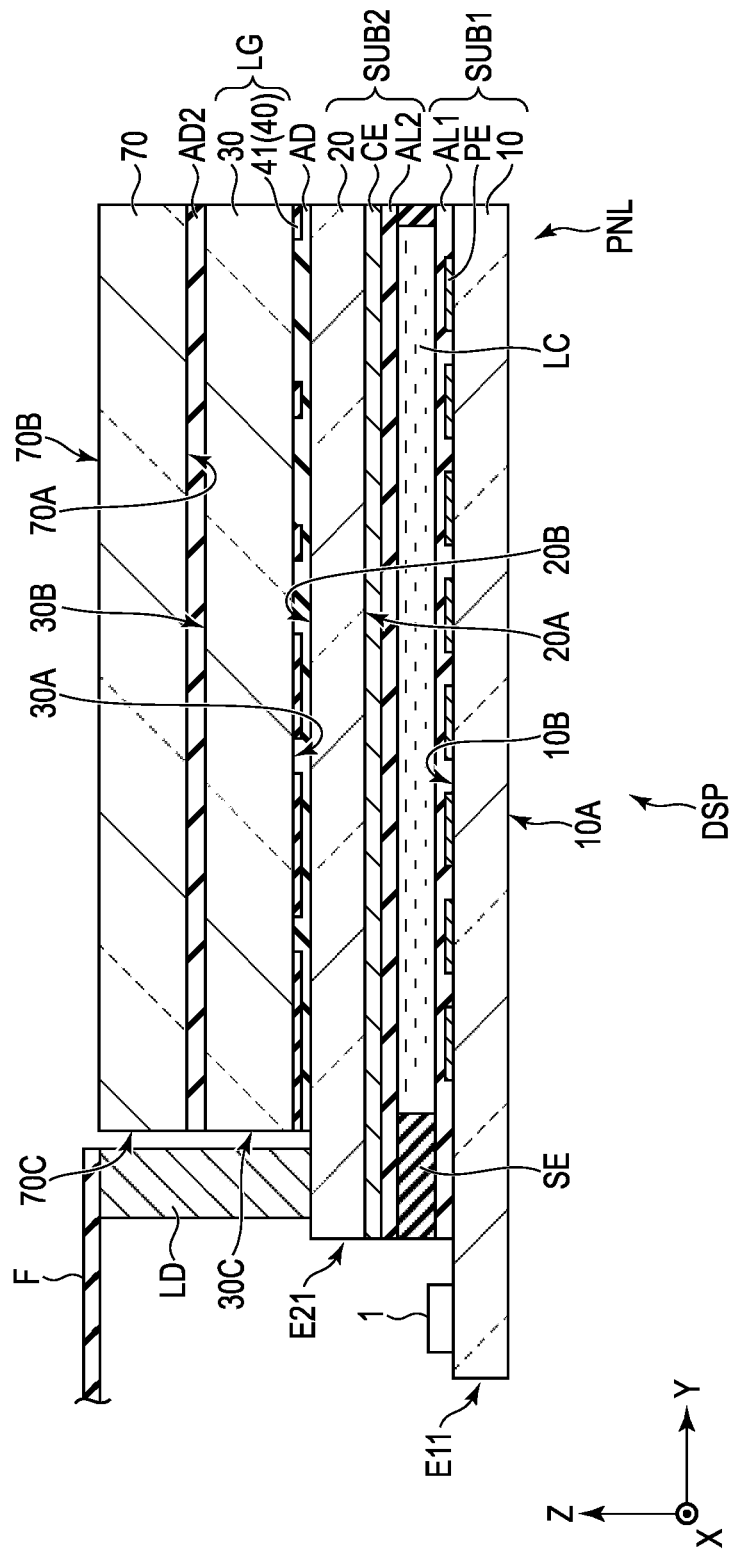
FIG. 9 is a cross-sectional view schematically showing still another configuration example different from that shown FIG. 5.

FIG. 9 is a cross-sectional view schematically showing a configuration example different from that of the display device DSP shown in FIG. 5. The configuration example illustrated in FIG. 9 is different from that of FIG. 5 in that the thickness of the transparent substrate 30 is less than the thickness of the light-emitting element LD, a cover member 70 is provided above the light guide element LG, which is more specifically, the cover member 70 is adhered to the transparent substrate 30 of the light guide element LG with a transparent adhesive layer AD2.

The cover member 70 is an insulating substrate such as a glass substrate or a plastic substrate, and has a refractive index equivalent to the refractive index n1 of the transparent substrates 10 to 30 and the transparent adhesive layers AD and AD1. For example, the cover member 70 is not formed from a plurality of substrates bonded together, but a single substrate. The cover member 70 comprises a main surface (lower surface) 70A, a main surface (upper surface) 70B on the opposite side to the main surface 70A, and a side surface 70C. The main surface 70A and 70B are surfaces substantially parallel to the X-Y plane. The main surface 70B faces the main surface 30 of the transparent substrate 30. The side surface 70C is a surface substantially parallel to the X-Z plane. The cover member 70 is adhered to the transparent substrate 30 via the transparent adhesive layer AD2. In the example illustrated in FIG. 9, the side surface 70C is located directly above the side surface 30C of the transparent substrate 30 (that is, the side surfaces 30C and 70C are overlapped on one another in plan view).

In such a configuration example also, as shown in FIG. 9, the entire emission surface of each light-emitting element LD faces the transparent substrate in which no elements that may generate undesired absorption or scattering are disposed, that is, the entire emission surface of each light-emitting element LD opposes the side surface 30C of the transparent substrate 30 and the side surface 70C of the cover member 70, the transparent layer 40 having a refractive index lower than that of the transparent substrate 30 is placed on the light guide element LG including the transparent substrate 30, and the light-emitting elements LD are placed on the transparent substrate 20, as in the case of the previous example. Therefore, advantageous effects similar to those of the configuration example illustrated in FIG. 5 can be obtained.

FIG. 10 is a cross-sectional view schematically showing a configuration example different from that of the display device DSP shown in FIG. 5. The configuration example illustrated in FIG. 10 is different from that of FIG. 5 in that a light guide element LG' is further provided below the first substrate SUB1, the thickness of the transparent substrate 30 is less than that of the light-emitting elements LD, and a cover member 70 is further provided above the light guide element LG.

In other words, the configuration example illustrated in FIG. 10 is a combination of the configuration examples shown in FIG. 7 and FIG. 9. Therefore, with such a configuration example, advantageous effects similar to those of the configuration examples illustrated in FIG. 7 and FIG. 9, that is, effects similar to those of the configuration example of FIG. 5 and those unique to the configuration example of FIG. 7 can be obtained.

Figure 11:
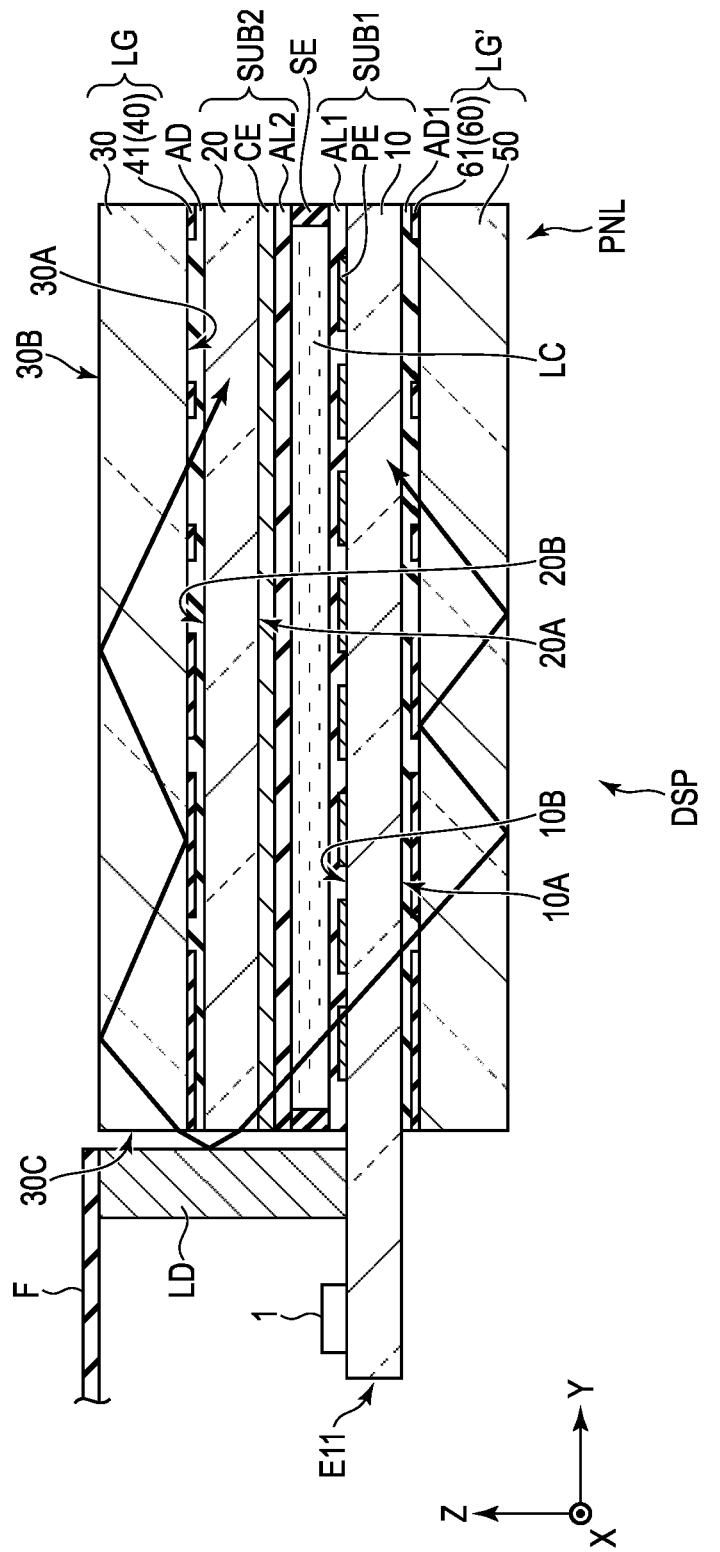
FIG. 11 is a cross-sectional view schematically showing still another configuration example different from that shown FIG. 5.

FIG. 11 is a cross-sectional view schematically showing a configuration example different from that of the display device DSP shown in FIG. 5. The configuration example illustrated in FIG. 11 is different from that of FIG. 5 in that a light guide element LG' is further provided below the first substrate SUB1, the thickness of the transparent substrate 30 is less than that of the light-emitting elements LD, and the light-emitting elements LD are placed on the transparent substrate 10.

In such a configuration example also, as shown in FIG. 11, the entire emission surface of each light-emitting element LD opposes not only the transparent substrate where no elements that cause undesired absorption or scattering are placed. However, the light guide element LG' provided below the first substrate SUB1 allows a portion of the light emitted from the light-emitting elements LD toward the transparent substrate 20, which enters the transparent substrate 50, to proceed to the regions distant away from the light-emitting elements LD without being attenuated more than necessary. As a result, even in the configuration example illustrated in FIG. 11, it is possible to suppress a sudden decrease in brightness in the regions distant away from the light-emitting elements LD.

According to the embodiment described above, it is possible to provide a display device with an improved display quality.

Note that a skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion and alternation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A display device comprising:
a first substrate comprising a first transparent substrate, a scanning line, a signal line intersecting the scanning line, a switching element electrically connected to the scanning line and the signal line, and a pixel electrode electrically connected to the switching element;
a second substrate comprising a second transparent substrate and a common electrode opposing the pixel electrode;
a liquid crystal layer held between the first substrate and the second substrate and containing stringy polymers and liquid crystal molecules;
a first light guide element comprising a third transparent substrate including a first side surface and a first main surface, and a first transparent layer disposed on the first main surface and having a refractive index lower than that of the third transparent substrate; and
a light-emitting element opposing the first side surface, wherein
the third transparent substrate is adhered to the second transparent substrate while interposing the first transparent layer therebetween,
the light-emitting element is disposed on the second transparent substrate, and
an area of the first transparent layer which is in contact with the first main surface is larger in a region as it is closer to the light-emitting element and smaller in a region as it is farther away from the light-emitting element.

2. The display device of claim 1, wherein
the light-emitting element is disposed in a region of the second transparent substrate, where the second transparent substrate and the third transparent substrate do not overlap each other in plan view.

3. The display device of claim 1, wherein
the first transparent substrate, the second transparent substrate and the third transparent substrate are overlapped on each other in plan view, and
the second transparent substrate is smaller than the first transparent substrate but larger than the third transparent substrate in plan view.

4. The display device of claim 1, wherein
a thickness of the third transparent substrate is equal to a thickness of the light-emitting element.

5. The display device of claim 1, wherein
a thickness of the third transparent substrate is greater than a thickness of the light-emitting element.

6. The display device of claim 1, further comprising:
a cover member having a refractive index equivalent to that of the third transparent substrate,
wherein
the cover member is adhered to the third transparent substrate on a main surface opposite to the first main surface on which the first transparent layer is disposed,
a thickness of the third transparent substrate is less than a thickness of the light-emitting element, and
a total thicknesses of the third transparent substrate and the cover member is equal to the thickness of the light-emitting element.

7. The display device of claim 1, further comprising:
a fourth transparent substrate including a second side surface and a second main surface and a second transparent layer disposed on the second main surface and having a refractive index lower than that of the fourth transparent substrate,
wherein
the fourth transparent substrate is adhered to the first transparent substrate while interposing the second transparent layer therebetween, and
the first side surface and the second side surface are superimposed on each other in plan view.

8. The display device of claim 7, wherein
the fourth transparent substrate has a refractive index equivalent to that of the third transparent substrate,
the second transparent layer has a refractive index equivalent to that of the first transparent layer, and
an area of the second transparent layer, which is in contact with the second main surface is larger in a region as it is closer to the light-emitting element and smaller in a region farther away from the light-emitting element.

9. A display device comprising:
a first substrate comprising a first transparent substrate, a scanning line, a signal line intersecting the scanning line, a switching element electrically connected to the scanning line and the signal line, and a pixel electrode electrically connected to the switching element;
a second substrate comprising a second transparent substrate and a common electrode opposing the pixel electrode;
a liquid crystal layer held between the first substrate and the second substrate and containing stringy polymers and liquid crystal molecules;
a first light guide element comprising a third transparent substrate including a first side surface and a first main surface, and a first transparent layer disposed on the first main surface and having a refractive index lower than that of the third transparent substrate;
a second light guide element comprising a fourth transparent substrate including a second side surface and a second main surface, and a second transparent layer disposed on the second main surface and having a refractive index lower than that of the fourth transparent substrate; and
a light-emitting element,
wherein
the third transparent substrate is adhered to the second transparent substrate while interposing the first transparent layer therebetween,
the fourth transparent substrate is adhered to the first transparent substrate while interposing the second transparent layer therebetween, the first side surface and the second side surface are overlapped on each other in plan view, the light-emitting element is disposed in a region of the first transparent substrate, where the first transparent substrate and the second transparent substrate are not overlapped in plan view, and at least a part thereof opposing the first side surface, and an area of the first transparent layer which is in contact with the first main surface is larger in a region as it is closer to the light-emitting element and smaller in a region as it is farther away from the light-emitting element.

* * * * *